(12) United States Patent
Han

(10) Patent No.: US 11,605,379 B2
(45) Date of Patent: Mar. 14, 2023

(54) ARTIFICIAL INTELLIGENCE SERVER

(71) Applicant: LG ELECTRONICS INC., Seoul (KR)

(72) Inventor: Jongwoo Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 155 days.

(21) Appl. No.: 16/498,356

(22) PCT Filed: Jul. 11, 2019

(86) PCT No.: PCT/KR2019/008598
§ 371 (c)(1),
(2) Date: Sep. 26, 2019

(87) PCT Pub. No.: WO2021/006404
PCT Pub. Date: Jan. 14, 2021

(65) Prior Publication Data
US 2020/0075004 A1    Mar. 5, 2020

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/167* (2013.01); *G10L 15/26* (2013.01); *G10L 15/30* (2013.01); *G10L 2015/223* (2013.01)

(58) Field of Classification Search
CPC ......... G10L 15/00; G10L 15/22; G10L 15/26; G10L 15/30; G10L 2015/223; G06F 3/00; G06F 3/167
See application file for complete search history.

(56) References Cited

U.S. PATENT DOCUMENTS 10,109,273 B1 * 10/2018 Rajasekaram .......... G10L 15/22
11,244,248 B1 * 2/2022 Kim ..................... G06K 9/6259
(Continued)

FOREIGN PATENT DOCUMENTS

JP    2017215898    12/2017
JP    2019009680    1/2019
(Continued)

OTHER PUBLICATIONS

Ioffe, S., & Szegedy, C., Batch normalization: accelerating deep network training by reducing internal covariate shift, 2015, arXiv: 1502.03167 (Year: 2015).*

(Continued)

*Primary Examiner* — Lamont M Spooner
*Assistant Examiner* — Sean E Serraguard
(74) *Attorney, Agent, or Firm* — Lee, Hong, Degerman, Kang & Waimey PC

(57) ABSTRACT

Disclosed is an artificial intelligence server. The artificial intelligence server includes a communicator in communication with at least one electronic device and a processor for receiving input data from a specific electronic device, applying personalized information corresponding to the specific electronic device to a recognition model, inputting the input data into the recognition model to which the personalized information is applied to obtain a final result value, and transmitting the final result value to the specific electronic device.

6 Claims, 7 Drawing Sheets

(51) Int. Cl.
*G10L 15/26* (2006.01)
*G10L 15/30* (2013.01)

(56) References Cited

U.S. PATENT DOCUMENTS

| | | |
|---|---|---|
| 2007/0136670 A1 | 6/2007 | Broos et al. |
| 2008/0004875 A1* | 1/2008 | Chengalvarayan ..... G10L 15/20 704/E15.039 |
| 2014/0288914 A1* | 9/2014 | Shen ..................... G10L 15/183 704/2 |
| 2018/0247065 A1* | 8/2018 | Rhee ....................... H04M 1/67 |
| 2019/0050683 A1* | 2/2019 | Gupta Hyde ....... H04L 63/0421 |
| 2019/0051288 A1* | 2/2019 | Lee ....................... G10L 15/183 |
| 2019/0088251 A1* | 3/2019 | Mun ..................... G10L 15/187 |
| 2019/0156203 A1 | 5/2019 | Kang et al. |
| 2019/0325861 A1* | 10/2019 | Singh ...................... G10L 15/16 |
| 2019/0341052 A1* | 11/2019 | Allibhai .................. G10L 25/90 |
| 2019/0371311 A1* | 12/2019 | Patel ....................... G06F 3/167 |
| 2020/0014761 A1 | 1/2020 | Kawaai et al. |
| 2020/0126534 A1* | 4/2020 | Yoo ......................... G10L 15/08 |

FOREIGN PATENT DOCUMENTS

| | | |
|---|---|---|
| KR | 101355668 | 1/2014 |
| KR | 1020190056720 | 5/2019 |
| WO | 2018173121 | 9/2018 |

OTHER PUBLICATIONS

PCT International Application No. PCT/KR2019/008598, Written Opinion of the International Searching Authority dated Apr. 9, 2020, 9 pages.

\* cited by examiner

ARTIFICIAL INTELLIGENCE SERVER

CROSS-REFERENCE TO RELATED APPLICATIONS

This application is the National Stage filing under 35 U.S.C. 371 of International Application No. PCT/KR2019/008598, filed on Jul. 11, 2019, the contents of which are hereby incorporated by reference herein in its entirety.

TECHNICAL FIELD

The present disclosure relates to an artificial intelligence server that may receive personalized information from a user requested recognition and perform personalized recognition using the received personalized information to save a storage space of the server and provide a personalized recognition service.

BACKGROUND ART

Artificial intelligence is a field of computer engineering and information technology that studies a method for allowing computers to think, learn, self-develop, and the like that may be performed by human intelligence. The artificial intelligence means that the computers may imitate the human intelligence.

Further, the artificial intelligence does not exist by itself, but directly or indirectly related to other fields of the computer science. Particularly in the modern age, attempts to introduce artificial intelligence elements in various fields of the information technology and to utilize the artificial intelligence elements in solving problems in the field are being actively carried out.

In one example, technologies for recognizing and learning a surrounding situation using the artificial intelligence and providing information desired by a user in a desired form or performing an operation or function desired by the user have been actively studied.

An electronic device providing such various operations and functions may be referred to as an artificial intelligence device.

The artificial intelligence device may include an electronic device used directly by the user and an artificial intelligence server that provides a recognition service to the electronic device while communicating with the electronic device.

Further, the artificial intelligence system may be composed of a plurality of electronic devices and the artificial intelligence server.

In an artificial intelligence system, the electronic device receives input data (video, speech, or the like) and transmits the input data to the artificial intelligence server. Then, the artificial intelligence server uses the input data to acquire a recognition result (e.g., presence or absence of an obstacle, a structure thereof, what is an object in the video, or the like in case of the video, and text corresponding to the speech, meaning of the speech, or the like in case of the speech) and then transmits the recognition result to the electronic device.

The artificial intelligence server provides the recognition service to the plurality of electronic devices. Further, generally, the artificial intelligence server obtains the recognition result by inputting the input data received from the plurality of electronic devices into one deep learning model.

In one example, a usage environment of each of the plurality of electronic devices may be different from each other. For example, in case of speech recognition, a first electronic device may be used by a user using a dialect of a specific region, a second electronic device may be used by a user uniquely pronouncing some words, a third electronic device may be used in an environment with a lot of ambient noise, and a fourth electronic device may be used by a user who utters at a high speed.

Further, when the recognition service is provided using one deep learning model for the plurality of electronic devices having different usage environments, it is difficult to provide a recognition service that is optimized for the usage environment of each electronic device, that is, a personalized recognition service.

In one example, there is a scheme of operating a deep learning model corresponding to each electronic device for optimizing the recognition service to the usage environment of each electronic device. For example, the scheme is in a manner of separately operating a first deep learning model suitable for the first electronic device of the user using the dialect of the specific region, a second deep learning model suitable for the second electronic device of the user uniquely pronouncing some words, a third deep learning model suitable for the third electronic device used in the environment with a lot of ambient noise, and a fourth deep learning model suitable for the fourth electronic device of the user who utters at high speed.

However, this scheme has a disadvantage in that a storage space required for the server becomes very large. For example, when a size of a deep learning model for the speech recognition is 80 MB and 130,000 electronic devices are provided with the speech recognition service from the server, 1 TB of the storage space will be required. In addition, considering the number of models of a product and a special case for each individual (fast uttering speed, noise environment, or the like), the storage space actually required increases significantly.

DISCLOSURE

Technical Purpose

The present disclosure is to solve the above-mentioned problems. A purpose of the present disclosure is to provide an artificial intelligence server that may receive personalized information from a user requested recognition and perform personalized recognition using the received personalized information to save a storage space of the server and provide a personalized recognition service.

Technical Solution

In one aspect, an artificial intelligence server includes a communicator in communication with at least one electronic device and a processor for receiving input data from a specific electronic device, applying personalized information corresponding to the specific electronic device to a recognition model, inputting the input data into the recognition model having the personalized information applied thereto, thereby to obtain a final result value, and transmitting the final result value to the specific electronic device.

In another aspect, an artificial intelligence electronic device includes a communicator in communication with an artificial intelligence server and a processor for transmitting input data to the artificial intelligence server, receiving an intermediate result value, an output value of a common model for the input data, from the artificial intelligence server, and inputting the intermediate result value to a personalized model to obtain a final result value.

Technical Effect

According to the present disclosure, the storage space of the artificial intelligence server may be saved while providing the personalized recognition service to each of the plurality of electronic devices.

DETAILED DESCRIPTIONS

Figure 1A:
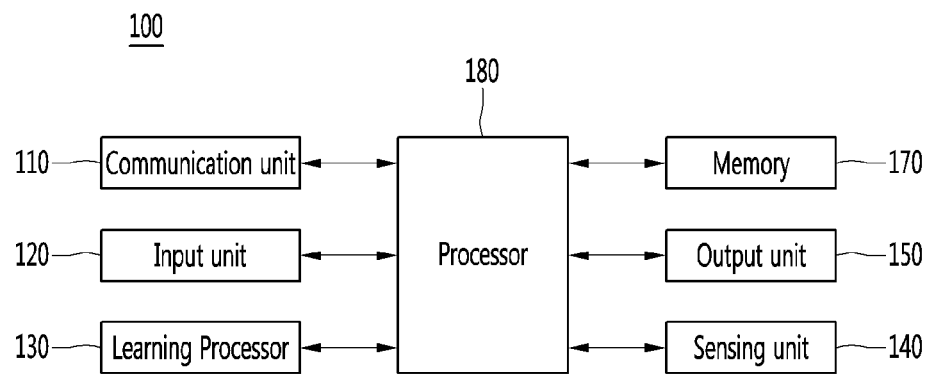
FIG. 1a illustrates an AI device 100 according to an embodiment of the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1a illustrates an AI device 100 according to an embodiment of the present disclosure.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1a, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI device 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 1B:
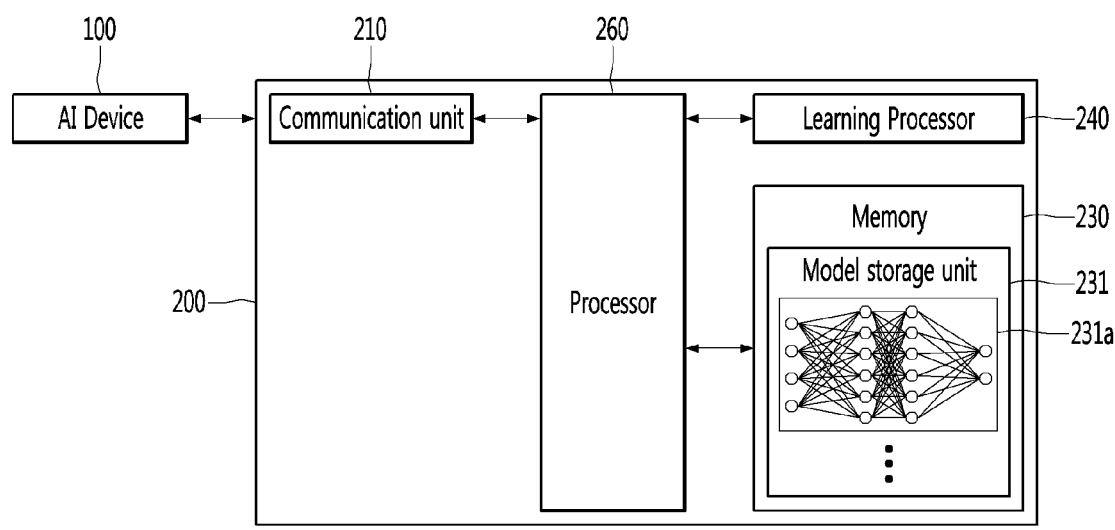
FIG. 1b illustrates an AI server 200 according to an embodiment of the present disclosure.

FIG. 1b illustrates an AI server 200 according to an embodiment of the present disclosure.

Referring to FIG. 1b, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 2:
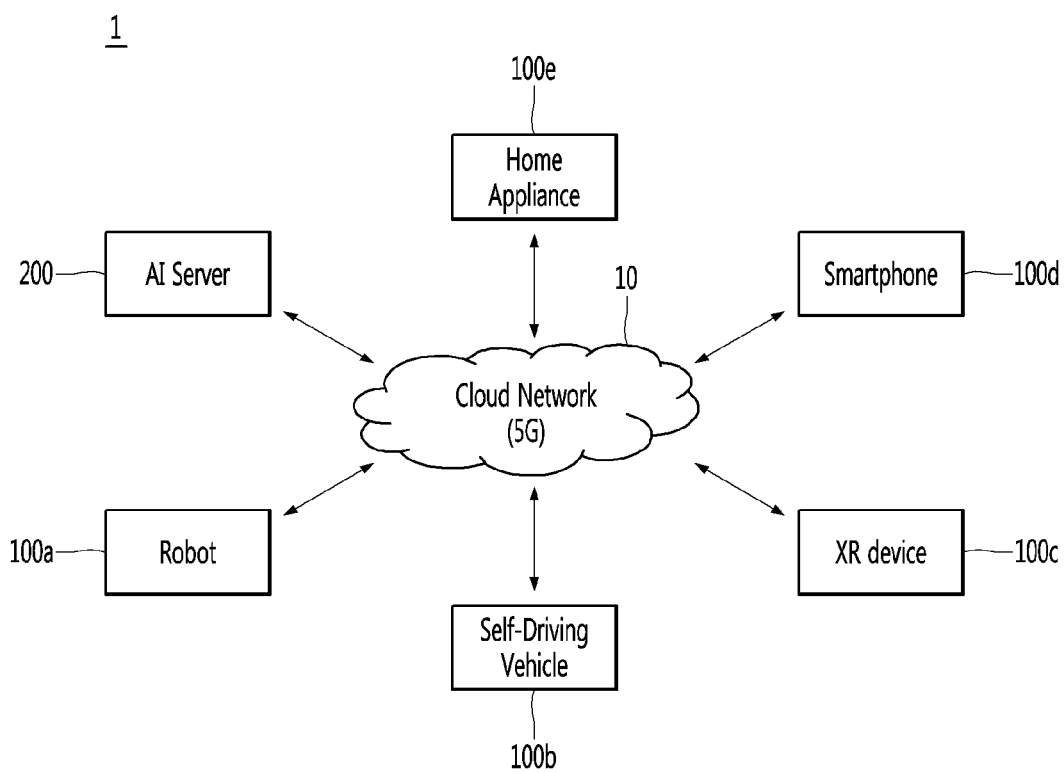
FIG. 2 illustrates an AI system 1 according to an embodiment of the present disclosure.

FIG. 2 illustrates an AI system 1 according to an embodiment of the present disclosure.

Referring to FIG. 2, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices shown in FIG. 1a.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and the AI server 200 configuring the AI system 1 may be connected to each other through the cloud network 10. In particular, each of the devices 100a to 100e and AI server 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 2 may be regarded as a specific embodiment of the AI device 100 illustrated in FIG. 1a.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100*a* may include a robot control module for controlling the operation, and the robot control module may refer to a software module or a chip implementing the software module by hardware.

The robot 100*a* may acquire state information about the robot 100*a* by using sensor information acquired from various kinds of sensors, may detect (recognize) surrounding environment and objects, may generate map data, may determine the route and the travel plan, may determine the response to user interaction, or may determine the operation.

The robot 100*a* may use the sensor information acquired from at least one sensor among the lidar, the radar, and the camera so as to determine the travel route and the travel plan.

The robot 100*a* may perform the above-described operations by using the learning model composed of at least one artificial neural network. For example, the robot 100*a* may recognize the surrounding environment and the objects by using the learning model, and may determine the operation by using the recognized surrounding information or object information. The learning model may be learned directly from the robot 100*a* or may be learned from an external device such as the AI server 200.

At this time, the robot 100*a* may perform the operation by generating the result by directly using the learning model, but the sensor information may be transmitted to the external device such as the AI server 200 and the generated result may be received to perform the operation.

The robot 100*a* may use at least one of the map data, the object information detected from the sensor information, or the object information acquired from the external apparatus to determine the travel route and the travel plan, and may control the driving unit such that the robot 100*a* travels along the determined travel route and travel plan.

The map data may include object identification information about various objects arranged in the space in which the robot 100*a* moves. For example, the map data may include object identification information about fixed objects such as walls and doors and movable objects such as pollen and desks. The object identification information may include a name, a type, a distance, and a position.

In addition, the robot 100*a* may perform the operation or travel by controlling the driving unit based on the control/interaction of the user. At this time, the robot 100*a* may acquire the intention information of the interaction due to the user's operation or speech utterance, and may determine the response based on the acquired intention information, and may perform the operation.

<AI+Self-Driving>

The self-driving vehicle 100*b*, to which the AI technology is applied, may be implemented as a mobile robot, a vehicle, an unmanned flying vehicle, or the like.

The self-driving vehicle 100*b* may include a self-driving control module for controlling a self-driving function, and the self-driving control module may refer to a software module or a chip implementing the software module by hardware. The self-driving control module may be included in the self-driving vehicle 100*b* as a component thereof, but may be implemented with separate hardware and connected to the outside of the self-driving vehicle 100*b*.

The self-driving vehicle 100*b* may acquire state information about the self-driving vehicle 100*b* by using sensor information acquired from various kinds of sensors, may detect (recognize) surrounding environment and objects, may generate map data, may determine the route and the travel plan, or may determine the operation.

Like the robot 100*a*, the self-driving vehicle 100*b* may use the sensor information acquired from at least one sensor among the lidar, the radar, and the camera so as to determine the travel route and the travel plan.

In particular, the self-driving vehicle 100*b* may recognize the environment or objects for an area covered by a field of view or an area over a certain distance by receiving the sensor information from external devices, or may receive directly recognized information from the external devices.

The self-driving vehicle 100*b* may perform the above-described operations by using the learning model composed of at least one artificial neural network. For example, the self-driving vehicle 100*b* may recognize the surrounding environment and the objects by using the learning model, and may determine the traveling movement line by using the recognized surrounding information or object information. The learning model may be learned directly from the self-driving vehicle 100*a* or may be learned from an external device such as the AI server 200.

At this time, the self-driving vehicle 100*b* may perform the operation by generating the result by directly using the learning model, but the sensor information may be transmitted to the external device such as the AI server 200 and the generated result may be received to perform the operation.

The self-driving vehicle 100*b* may use at least one of the map data, the object information detected from the sensor information, or the object information acquired from the external apparatus to determine the travel route and the travel plan, and may control the driving unit such that the self-driving vehicle 100*b* travels along the determined travel route and travel plan.

The map data may include object identification information about various objects arranged in the space (for example, road) in which the self-driving vehicle 100*b* travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100*b* may perform the operation or travel by controlling the driving unit based on the control/interaction of the user. At this time, the self-driving vehicle 100*b* may acquire the intention information of the interaction due to the user's operation or speech utterance, and may determine the response based on the acquired intention information, and may perform the operation.

<AI+XR>

The XR device 100*c*, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100*c* may analyzes three-dimensional point cloud data or image data acquired from various sensors or the external devices, generate position data and attribute data for the three-dimensional points, acquire information about the surrounding space or the real object, and render to output the XR object to be output. For example, the XR device 100*c* may output an XR object including the additional information about the recognized object in correspondence to the recognized object.

The XR device 100*c* may perform the above-described operations by using the learning model composed of at least one artificial neural network. For example, the XR device 100*c* may recognize the real object from the three-dimensional point cloud data or the image data by using the learning model, and may provide information corresponding to the recognized real object. The learning model may be directly learned from the XR device 100*c*, or may be learned from the external device such as the AI server 200.

At this time, the XR device 100*c* may perform the operation by generating the result by directly using the learning model, but the sensor information may be transmitted to the external device such as the AI server 200 and the generated result may be received to perform the operation.

<AI+Robot+Self-Driving>

The robot 100*a*, to which the AI technology and the self-driving technology are applied, may be implemented as a guide robot, a carrying robot, a cleaning robot, a wearable robot, an entertainment robot, a pet robot, an unmanned flying robot, or the like.

The robot 100*a*, to which the AI technology and the self-driving technology are applied, may refer to the robot itself having the self-driving function or the robot 100*a* interacting with the self-driving vehicle 100*b*.

The robot 100*a* having the self-driving function may collectively refer to a device that moves for itself along the given movement line without the user's control or moves for itself by determining the movement line by itself.

The robot 100*a* and the self-driving vehicle 100*b* having the self-driving function may use a common sensing method so as to determine at least one of the travel route or the travel plan. For example, the robot 100*a* and the self-driving vehicle 100*b* having the self-driving function may determine at least one of the travel route or the travel plan by using the information sensed through the lidar, the radar, and the camera.

The robot 100*a* that interacts with the self-driving vehicle 100*b* exists separately from the self-driving vehicle 100*b* and may perform operations interworking with the self-driving function of the self-driving vehicle 100*b* or interworking with the user who rides on the self-driving vehicle 100*b*.

At this time, the robot 100*a* interacting with the self-driving vehicle 100*b* may control or assist the self-driving function of the self-driving vehicle 100*b* by acquiring sensor information on behalf of the self-driving vehicle 100*b* and providing the sensor information to the self-driving vehicle 100*b*, or by acquiring sensor information, generating environment information or object information, and providing the information to the self-driving vehicle 100*b*.

Alternatively, the robot 100*a* interacting with the self-driving vehicle 100*b* may monitor the user boarding the self-driving vehicle 100*b*, or may control the function of the self-driving vehicle 100*b* through the interaction with the user. For example, when it is determined that the driver is in a drowsy state, the robot 100*a* may activate the self-driving function of the self-driving vehicle 100*b* or assist the control of the driving unit of the self-driving vehicle 100*b*. The function of the self-driving vehicle 100*b* controlled by the robot 100*a* may include not only the self-driving function but also the function provided by the navigation system or the audio system provided in the self-driving vehicle 100*b*.

Alternatively, the robot 100*a* that interacts with the self-driving vehicle 100*b* may provide information or assist the function to the self-driving vehicle 100*b* outside the self-driving vehicle 100*b*. For example, the robot 100*a* may provide traffic information including signal information and the like, such as a smart signal, to the self-driving vehicle 100*b*, and automatically connect an electric charger to a charging port by interacting with the self-driving vehicle 100*b* like an automatic electric charger of an electric vehicle.

<AI+Robot+XR>

The robot 100*a*, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100*a*, to which the XR technology is applied, may refer to a robot that is subjected to control/interaction in an XR image. In this case, the robot 100*a* may be separated from the XR device 100*c* and interwork with each other.

When the robot 100*a*, which is subjected to control/interaction in the XR image, may acquire the sensor information from the sensors including the camera, the robot 100*a* or the XR device 100*c* may generate the XR image based on the sensor information, and the XR device 100*c* may output the generated XR image. The robot 100*a* may operate based on the control signal input through the XR device 100*c* or the user's interaction.

For example, the user can confirm the XR image corresponding to the time point of the robot 100*a* interworking remotely through the external device such as the XR device 100*c*, adjust the self-driving travel path of the robot 100*a* through interaction, control the operation or driving, or confirm the information about the surrounding object.

<AI+Self-Driving+XR>

The self-driving vehicle 100*b*, to which the AI technology and the XR technology are applied, may be implemented as a mobile robot, a vehicle, an unmanned flying vehicle, or the like.

The self-driving driving vehicle 100*b*, to which the XR technology is applied, may refer to a self-driving vehicle having a means for providing an XR image or a self-driving vehicle that is subjected to control/interaction in an XR image. Particularly, the self-driving vehicle 100*b* that is subjected to control/interaction in the XR image may be distinguished from the XR device 100*c* and interwork with each other.

The self-driving vehicle 100*b* having the means for providing the XR image may acquire the sensor information from the sensors including the camera and output the generated XR image based on the acquired sensor information. For example, the self-driving vehicle 100*b* may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100*b*, at least part of the XR object may be output so as to overlap the object in the screen. For example, the self-driving vehicle 100*b* may output XR objects corresponding to objects such as a lane, another vehicle, a traffic light, a traffic sign, a two-wheeled vehicle, a pedestrian, a building, and the like.

Figure 3:
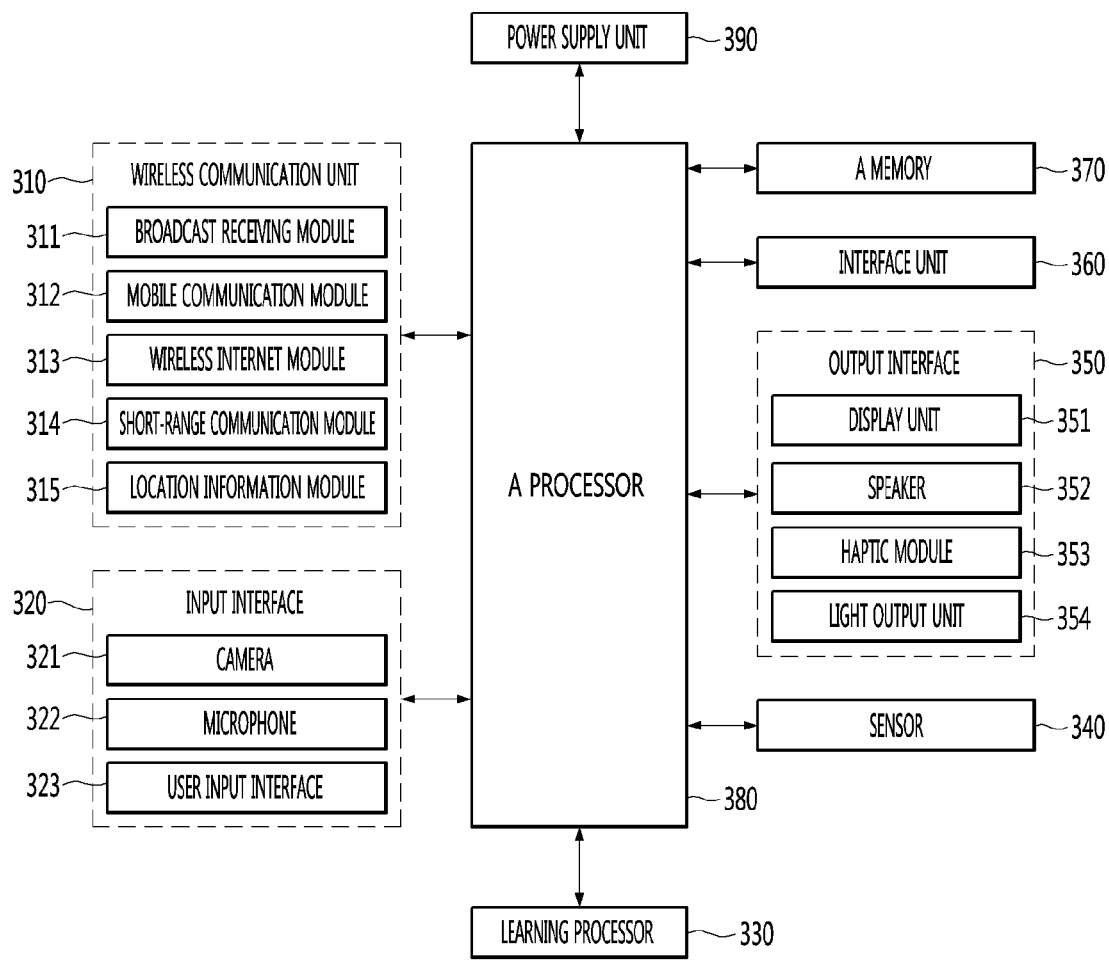
FIG. 3 is a block diagram illustrating a configuration of an electronic device 300 according to an embodiment of the present disclosure.

When the self-driving vehicle 100*b*, which is subjected to control/interaction in the XR image, may acquire the sensor information from the sensors including the camera, the self-driving vehicle 100*b* or the XR device 100*c* may generate the XR image based on the sensor information, and the XR device 100*c* may output the generated XR image. The self-driving vehicle 100*b* may operate based on the control signal input through the external device such as the XR device 100*c* or the user's interaction. FIG. 3 is a block diagram illustrating a configuration of an electronic device 300 according to an embodiment of the present disclosure.

The electronic device 300 may be implemented as a stationary device, a movable device, or the like such as a mobile phone, a projector, a smart phone, a laptop computer, an electronic device for digital broadcasting, a personal digital assistant (PDA), a portable multimedia player (PMP), a navigation, a slate PC, a tablet PC, an ultrabook, a wearable device (e.g., a watch type electronic device (smartwatch), a glass type electronic device (smart glass), a head mounted display (HMD)), a set top box (STB), a DMB receiver, a radio, a washing machine, a refrigerator, a desktop computer, and a digital signage.

That is, the electronic device 300 may be implemented in a form of various home appliances used in the home, and may be applied to a robot that may be fixed or movable.

The electronic device 300 may perform a function of a speech agent. The speech agent may be a program that recognizes a user's speech and outputs a response suitable for the recognized user's speech in a speech form.

The electronic device 300 may perform a function of a speech agent. The speech agent may be a program that recognizes a user's speech and outputs a response suitable for the recognized user's speech in a speech form.

The electronic device 300 may include a wireless communication unit 310, an input interface 320, a learning processor 330, a sensor 340, an output interface 350, an interface unit 360, a memory 370, a processor 380, and a power supply unit 390.

A trained model may be mounted on the electronic device 300.

In one example, the trained model may be implemented in hardware, software, or a combination of the hardware and software. When a portion of entirety of the trained model is implemented in the software, at least one instructions constituting the trained model may be stored in a memory 370.

The wireless communicator 310 includes one or more of a broadcast receiving module 31311, a mobile communication module 312, a wireless Internet module 313, a short-range communication module 314, and a location information module 315. Regarding the wireless communicator 310, the broadcast receiving module 31311 is typically configured to receive a broadcast signal and/or broadcast associated information from an external broadcast managing entity via a broadcast channel. The mobile communication module 312 can transmit and/or receive wireless signals to and from one or more network entities. Typical examples of a network entity include a base station, an external mobile electronic device, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 312 include audio call signals, video (telephony) call signals, or various formats of data to support communication of text and multimedia messages.

The wireless Internet module 313 is configured to facilitate wireless Internet access. This module may be internally or externally coupled to the mobile electronic device 300.

The wireless Internet module 313 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 313 may transmit/receive data according to one or more of such wireless Internet technologies, and other Internet technologies as well.

The short-range communication module 314 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 314 in general supports wireless communications between the mobile electronic device 300 and a wireless communication system, communications between the mobile electronic device 300 and another mobile electronic device 300, or communications between the mobile electronic device and a network where another mobile electronic device 300 (or an external server) is located, via wireless area networks. One example of the wireless area networks is a wireless personal area networks.

A location information module 315 is a module for obtaining a location (or a current location) of a mobile electronic device. Further, a representative example of the location information module 315 is a global positioning system (GPS) module or a wireless fidelity (WiFi) module. For example, when utilizing the GPS module, the electronic device may acquire a location of the mobile electronic device using a signal transmitted from a GPS satellite.

The input interface 320 may include a camera 321 for input of a video signal, a microphone 322 for receiving an audio signal, and a user input interface 323 for receiving information from a user.

The speech data or image data collected by the input interface 320 may be analyzed and processed as a user's control command.

The input interface 320 may obtain input data or the like to be used when obtaining output using training data for model training and the trained model.

The input interface 320 may obtain raw input data. In this case, the processor 380 or the learning processor 330 may preprocess the obtained data to generate training data or preprocessed input data that may be input to the model learning.

In this case, the preprocessing for the input data may mean extracting an input feature from the input data.

The input interface 320 may be configured to permit various types of input to the electronic device. Examples of such input include audio, image, video, data, and user input.

Image and video input is often obtained using one or more cameras 321. cameras 321 may process image frames of still pictures or video obtained by image sensors in a video or image capture mode. The processed image frames can be displayed on the display 151 or stored in memory 370. The microphone 322 is generally implemented to permit audio input to the mobile electronic device 300. The audio input can be processed in various manners according to a function being executed in the mobile electronic device 300. If desired, the microphone 322 may include assorted noise removing algorithms to remove unwanted noise generated in the course of receiving the external audio. The user input interface 323 is a component that permits input by a user. Such user input may enable the processor 380 to control operation of the electronic device 300. The user input interface 323 may include one or more of a mechanical input element (for example, a key, a button located on a front and/or rear surface or a side surface of the electronic device 300, a dome switch, a jog wheel, a jog switch, and the like), or a touch-sensitive input, among others.

As one example, the touch-sensitive input may be a virtual key or a soft key, which is displayed on a touch screen through software processing, or a touch key which is located on the mobile electronic device at a location that is other than the touch screen.

A learning processor 330 learns a model composed of an artificial neural network using training data.

Specifically, the learning processor 330 repeatedly trains the artificial neural network using various training techniques described above, thereby determining optimized model parameters of the artificial neural network.

In this specification, the artificial neural network whose parameters are determined by being trained using the training data may be referred to as the trained model.

In this connection, the trained model may be used to infer a result value for new input data rather than the training data.

The learning processor 330 may be configured to receive, classify, store, and output information to be used for data mining, data analysis, intelligent decision making, and machine learning algorithms and techniques.

The learning processor 330 may include at least one memory unit configured to store data received, detected, sensed, generated, predefined, or output by another component, device, electronic device, or device in communication with the electronic device.

The learning processor 330 may include a memory integrated with or implemented in the electronic device. In some embodiments, the learning processor 330 may be implemented using the memory 370.

Selectively or additionally, the learning processor 330 may be implemented using a memory associated with the electronic device, such as an external memory directly coupled to the electronic device or a memory maintained in a server in communication with the electronic device.

In another embodiment, the learning processor 330 may be implemented using a memory maintained in a cloud computing environment or another remote memory location accessible by the electronic device via a communication scheme such as a network.

The learning processor 330 may be configured to store data in at least one database for identifying, indexing, categorizing, manipulating, storing, retrieving, and outputting the data for use in supervised or unsupervised learning, data mining, predictive analysis, or other machines. In this connection, the database may be implemented using the memory 370, a memory 230 of the AI server 200, the memory maintained in the cloud computing environment, or another remote memory location accessible by the electronic device via the communication scheme such as the network.

The information stored in the running processor 330 may be utilized by the processor 380 or one or more other controllers of the electronic device using any of a variety of different types of data analysis algorithms and machine learning algorithms.

Examples of such algorithms include k-nearest neighbor systems, fuzzy logic (e.g. Probability Theory), Neural Network, Boltzmann Machine, Vector Quantization, Pulse Neural Network, Support Vector Machine, Maximum Margin Classifier, Hill Climbing, Induction Logic System Bayesian Network, Peritnet (e.g., finite state machine, a millimachine, a Moore finite state machine), a classifier tree (e.g., Perceptron Tree, Support Vector Tree, Markov Tree, Decision Trees Forest, Random Forest) Potting Model and System, Artificial Fusion, Sensor Fusion, Image Fusion, Reinforcement Learning, Augmented Reality, Pattern Recognition, Automated Plan and the like.

A processor 380 may determine or predict at least one executable operation of the electronic device based on information determined or generated using the data analysis and machine learning algorithm. To this end, the processor 380 may request, retrieve, receive, or utilize data of the learning processor 330 and may control the electronic device to execute an operation predicted or an operation determined to be preferable among the at least one executable operation.

The processor 380 may perform various functions to implement intelligent emulation (i.e., a knowledge based system, an inference system, and a knowledge acquisition system). This may be applied to various types of systems (e.g., fuzzy logic systems), including adaptive systems, machine learning systems, artificial neural networks, and the like.

The processor 380 may also include sub-modules for enabling computations involving speech and natural language speech processing such as an I/O processing module, an environmental condition module, a speech-text (STT) processing module, a natural language processing module, a workflow processing module, a service processing module.

Each of these sub-modules may have access to one or more systems or data and models or a subset or superset thereof in the electronic device. In addition, each of the sub-modules may provide various functions, including a vocabulary index, user data, a workflow model, a service model, and an automatic speech recognition (ASR) system.

In another embodiment, the processor 380 or another aspect of the electronic device may be implemented with the sub-modules, systems, or data, and models.

In some examples, based on the data of the running processor 330, the processor 380 may be configured to detect and sense requirements based on a context condition or the user's intention which is represented by a user input or a natural language input.

The processor 380 may actively derive and obtain information necessary to fully determine the requirements based on the context condition or the user's intention. For example, the processor 380 may actively derive the necessary information to determine requirements by analyzing historical data including historical inputs and outputs, pattern matching, unambiguous words, input intentions, and the like The processor 380 may determine a task flow for executing a function for responding to a requirement based on the context condition or the user's intention.

The processor 380 may collect, sense, extract, and detect and/or receive signals or data used for data analysis and machine learning operations through one or more sensing components in the electronic device, in order to collect information for processing and storage in the running processor 330.

Information collection may include sensing information through a sensor, extracting information stored in the memory 370, or receiving information from another electronic device, an entity, or an external storage device through communication means.

The processor 380 may collect and store usage history information from the electronic device.

The processor 380 may determine the optimal matching to perform a particular function using the stored usage history information and predictive modeling The processor 380 may receive or sense surrounding environment information or other information through the sensor 340.

The processor 380 may receive broadcast signals and/or broadcast-related information, wireless signals, and wireless data through the wireless communicator 310.

The processor 380 may receive image information (or a corresponding signal), audio information (or a corresponding signal), data, or user input information from the input interface 320.

The processor 380 may collect information in real time, process or classify the information (e.g., knowledge graphs, command policies, personalization databases, dialog engines, etc.) and store the processed information in the memory 370 or the running processor 330.

When the operation of the electronic device is determined based on data analysis and machine learning algorithms and techniques, the processor 380 may control the components of the electronic device to perform the determined operation. The processor 380 may control the electronic device according to the control command and then perform the determined operation.

The processor 380 may analyze historical information indicating the performance of a particular operation through data analysis and machine learning algorithms and techniques when the particular operation is performed, and perform update of previously learned information based on the analyzed information.

Thus, the processor 380 may improve the accuracy of future performance of data analysis and machine learning algorithms and techniques based on the updated information in cooperation with the running processor 330.

The sensor 340 is typically implemented using one or more sensors configured to sense internal information of the mobile electronic device, the surrounding environment of the mobile electronic device, user information, and the like. For example, in FIG. 1A, the sensor 340 is shown having a proximity sensor 141 and an illumination sensor 142.

If desired, the sensor 340 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 321), a microphone 322, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile electronic device 300 may be configured to utilize information obtained from sensor 340, and in particular, information obtained from one or more sensors of the sensor 340, and combinations thereof.

The output interface 350 is typically configured to output various types of information, such as audio, video, tactile output, and the like. The output interface 350 is shown having a display 151, an audio output module 152, a haptic module 153, and an optical output module 154.

The display 151 displays (outputs) information processed by the electronic device 300. For example, the display 151 may display execution screen information of an application program driven in the electronic device 300, or UI (User Interface) and GUI (Graphic User Interface) information according to the execution screen information.

The display 151 may have an inter-layered structure or an integrated structure with a touch sensor in order to facilitate a touch screen. The touch screen may provide an output interface between the electronic device 300 and a user, as well as function as the user input interface 323 which provides an input interface between the electronic device 300 and the user.

The audio output module 152 is generally configured to output audio data. Such audio data may be obtained from any of a number of different sources, such that the audio data may be received from the wireless communication unit 310 or may have been stored in the memory 370. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile electronic device 300. The audio output module 152 may also be implemented as a receiver, a speaker, a buzzer, or the like. A haptic module 153 can be configured to generate various tactile effects that a user feels, perceive, or otherwise experience. A typical example of a tactile effect generated by the haptic module 153 is vibration. An optical output module 154 can output a signal for indicating an event generation using light of a light source. Examples of events generated in the mobile electronic device 300 may include message reception, call signal reception, a missed call, an alarm, a schedule notice, an email reception, information reception through an application, and the like.

A signal output by the optical output module 154 may be implemented in such a manner that the mobile electronic device emits monochromatic light or light with a plurality of colors. The signal output may be terminated as the mobile electronic device senses that a user has checked the generated event, for example. The interface unit 360 serves as an interface for various external devices to be connected with the mobile electronic device 300. The interface unit 360 may include wired or wireless headset ports, external power supply ports, wired or wireless data ports, memory card ports, ports for connecting a device having an identification module, audio input/output (I/O) ports, video I/O ports, earphone ports, or the like. The electronic device 300 may perform appropriate control related to a connected external device in response to the connection of the external device to the interface unit 360.

The identification module may be a chip that stores various information for authenticating authority of using the mobile electronic device 300 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the electronic device 300 via the interface unit 360.

The memory 370 stores data supporting various functions of the electronic device 300.

The memory 370 may store a plurality of application programs or applications that are run on the electronic device 300, data and instructions for operation of the electronic device 300, and data and instructions for operation of the running processor 330 (e.g., at least one algorithm information for machine learning).

The memory 370 may store models trained by the learning processor 330 or the AI server 200.

In this connection, the memory 370 may classify and store the trained models into a plurality of versions based on a learning time point, learning progress, or the like.

In this connection, the memory 370 may store the input data acquired from the input interface 320, the training data used for the model training, learning history of the model, or the like.

In this connection, the input data stored in the memory 370 may be not only data processed suitable for the model training, but also raw input data itself.

The processor 380 typically functions to control overall operation of the mobile electronic device 300, in addition to the operations associated with the application programs. The processor 380 may provide or process information or functions appropriate for a user by processing signals, data, information and the like, which are input or output by the various components depicted in FIG. 2A, or activating application programs stored in the memory 370. As one example, the processor 380 controls some or all of the components illustrated in FIG. 2A according to the execution of an application program that have been stored in the memory 370.

In one example, as described above, the processor 380 controls operations related to application programs and typically the overall operations of the electronic device 300. For example, when a state of the electronic device satisfies a set condition, the processor 380 may activate or deactivate a lock state that restricts input of a user's control command for applications.

The power supply unit 390 can be configured to receive external power or provide internal power in order to supply appropriate power required for operating elements and components included in the mobile electronic device 300. The power supply unit 390 may include a battery, and the battery may be configured to be embedded in the electronic device body, or configured to be detachable from the electronic device body.

Figure 4:
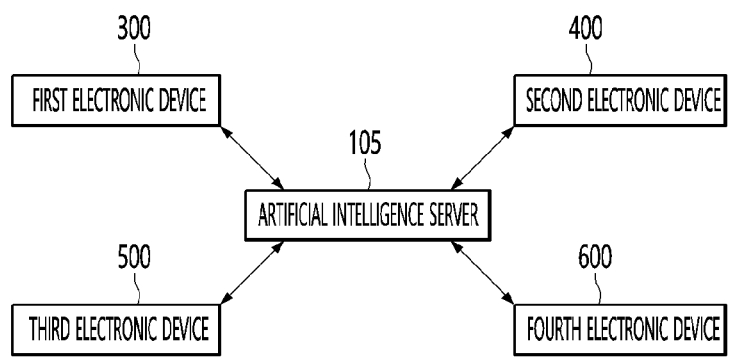
FIG. 4 illustrates an artificial intelligence system according to an embodiment of the present disclosure.

In one example, the AI device 100 described above may be the artificial intelligence server 100 shown in FIG. 4, and thus the term AI device 100 may be used interchangeably with the term artificial intelligence server 100 shown in FIG. 4.

In addition, the term electronic device 300 may be used interchangeably with the term artificial intelligence electronic device 300.

In addition, electronic devices 400, 500, and 600 to be described below may include the configuration of the electronic device 300 described with reference to FIG. 3 and may perform the function of the electronic device 300 described in FIG. 3.

FIG. 4 illustrates an artificial intelligence system according to an embodiment of the present disclosure.

The artificial intelligence system according to the embodiment of the present disclosure may include the artificial intelligence server 100 and the plurality of electronic devices 300, 400, 500, and 600.

The plurality of electronic devices 300, 400, 500, and 600 may communicate with the artificial intelligence server 100.

Specifically, each of the plurality of artificial intelligence devices 300, 400, 500, and 600 may include a communication unit. Further, the communication unit may provide an interface for connecting the electronic device to a wired/wireless network including an internet network. The communication unit may transmit or receive data with the server via a connected network or other networks linked to the connected network.

In one example, the plurality of artificial intelligence devices 300, 400, 500, and 600 may perform a function corresponding to the input data.

Specifically, the plurality of artificial intelligence devices 300, 400, 500, and 600 may receive input data and transmit the input data to the artificial intelligence server 100. In this case, the artificial intelligence server 600 may input the input data into the recognition model to obtain a result value, and transmit the obtained result value to the plurality of artificial intelligence devices 300, 400, 500, and 600. In this case, the plurality of artificial intelligence devices 300, 400, 500, and 600 may generate a control command corresponding to the result value to perform control or output a recognition result.

In this connection, the input data may be speech data. When the input data is the speech data, the recognition model of the artificial intelligence server 100 may analyze the speech data, extract features therefrom, and convert the speech data into texts or commands.

In addition, the input data may be video data. When the input data is the video data, the recognition model of the artificial intelligence server 100 may recognize what an object in the video is, or recognize a location, a shape, a color, or the like of the object in the video.

Figure 5:
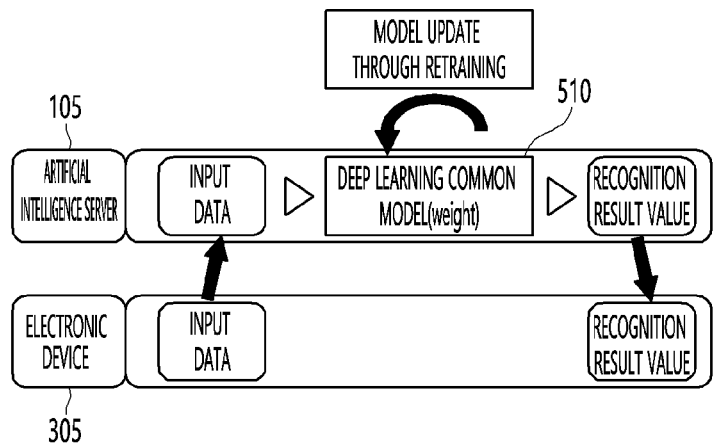
FIG. 5 is a view for illustrating a problem of the prior art.

FIG. 5 is a view for illustrating a problem of the prior art. Below, the electronic device 300 shown in FIGS. 5, 7-9, and 11 may represent the first electronic device 300 shown in FIG. 4.

In the artificial intelligence system, the electronic device 300 receives input data (video, speech, or the like) and transmits the input data to the artificial intelligence server 100. Then, the artificial intelligence server 100 uses the input data to acquire a recognition result (e.g., presence or absence of an obstacle, a structure thereof, what is an object in the video, or the like in case of the video, and text corresponding to the speech, meaning of the speech, or the like in case of the speech) and then transmits the recognition result to the electronic device 300.

That is, the artificial intelligence server 100 provides a recognition service to a plurality of electronic devices. Further, generally, the artificial intelligence server 100 obtains the recognition result by inputting the input data received from the plurality of electronic devices into one deep learning model 510.

In one example, a usage environment of each of the plurality of electronic devices may be different from each other. For example, in case of speech recognition, a first electronic device may be used by a user using a dialect of a specific region, a second electronic device may be used by a user uniquely pronouncing some words, a third electronic device may be used in an environment with a lot of ambient noise, and a fourth electronic device may be used by a user who utters at a high speed.

Further, when the recognition service is provided using one deep learning model for the plurality of electronic devices having different usage environments, it is difficult to provide a recognition service that is optimized for the usage environment of each electronic device, that is, a personalized recognition service.

In one example, there is a scheme of operating a deep learning model corresponding to each electronic device for optimizing the recognition service to the usage environment of each electronic device. For example, the scheme is in a manner of separately operating a first deep learning model suitable for the first electronic device of the user using the dialect of the specific region, a second deep learning model suitable for the second electronic device of the user uniquely pronouncing some words, a third deep learning model suitable for the third electronic device used in the environment with a lot of ambient noise, and a fourth deep learning model suitable for the fourth electronic device of the user who utters at high speed.

However, this scheme has a disadvantage in that a storage space required for the server becomes very large. For example, when a size of a deep learning model for the speech recognition is 80 MB and 130,000 electronic devices are provided with the speech recognition service from the server, 1 TB of the storage space will be required. In addition, considering the number of models of a product and a special case for each individual (fast uttering speed, noise environment, or the like), the storage space actually required increases significantly.

Figure 6:
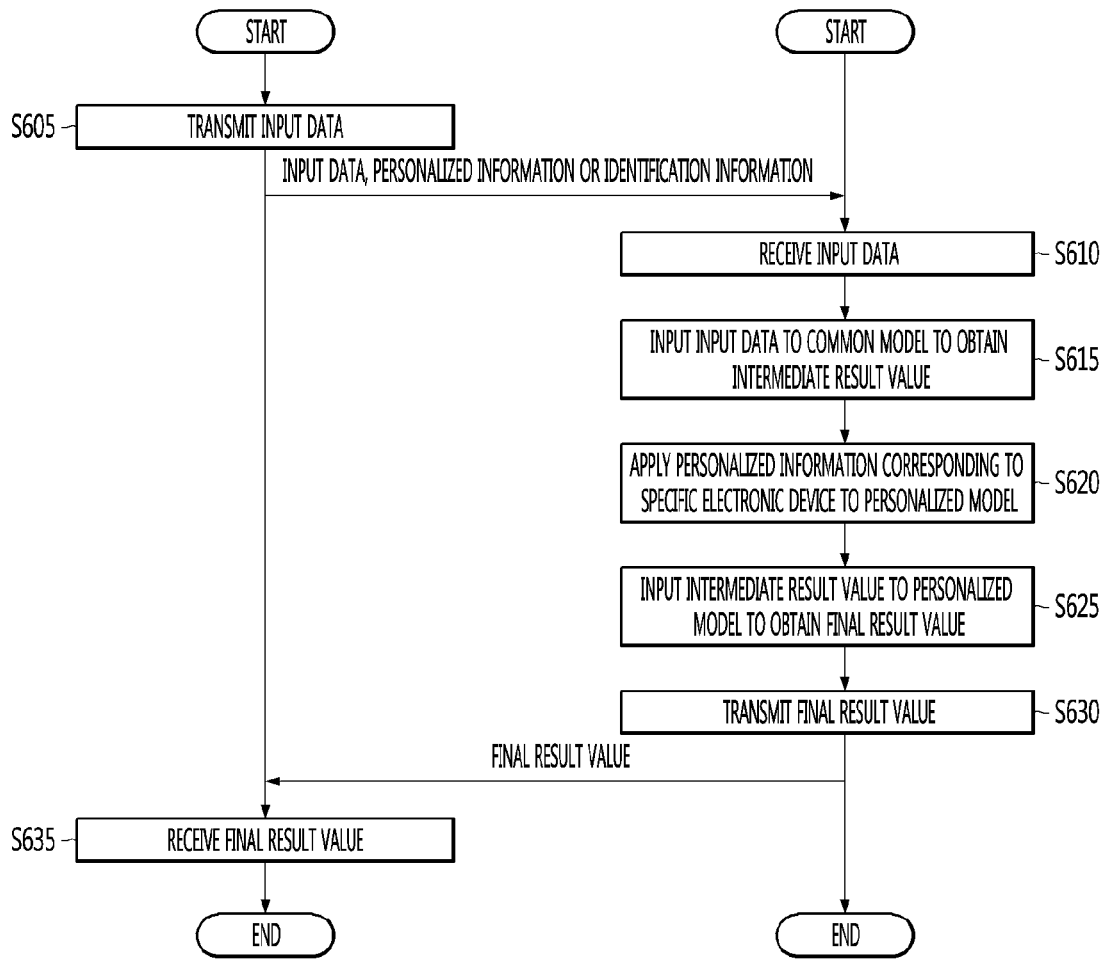
FIG. 6 is a flowchart for illustrating a method for operating an artificial intelligence system according to a first embodiment of the present disclosure.

FIG. 6 is a flowchart for illustrating a method for operating an artificial intelligence system according to a first embodiment of the present disclosure.

The method for operating the artificial intelligence system according to the first embodiment of the present disclosure includes receiving, by a specific electronic device 300, input data and transmitting the received input data to the artificial intelligence server 100 (S605), receiving, by the artificial intelligence server 100, the input data from the specific electronic device (S610), inputting, by the artificial intelligence server 100, the input data to a common model to obtain an intermediate result value (S615), applying, by the artificial intelligence server 100, personalized information corresponding to the specific electronic device to a personalized model (S620), inputting, by the artificial intelligence server 100, the intermediate result value into the personalized model to obtain a final result value (S625), transmitting, by the artificial intelligence server 100, the final result value to the specific electronic device 300 (S630), and receiving, by the artificial intelligence server 100, the final result value (S635).

The first embodiment will be described in detail with reference to FIG. 7.

Figure 7:
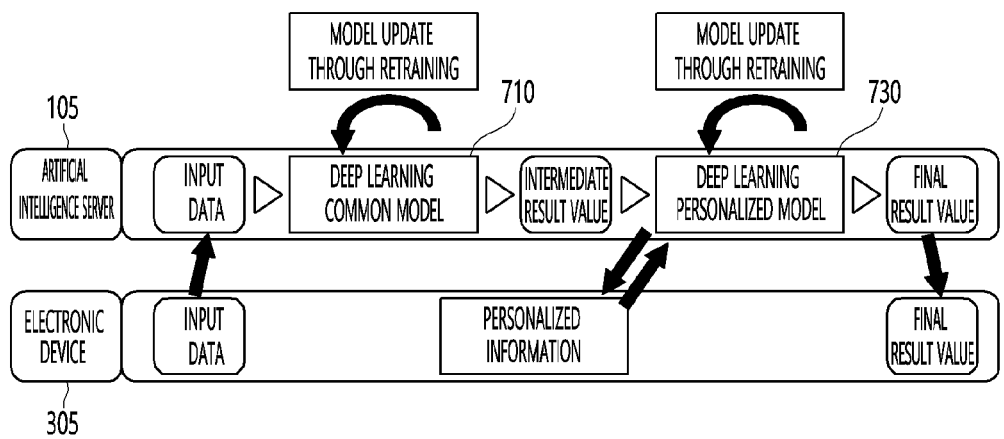
FIG. 7 is a block diagram for illustrating a method for operating an artificial intelligence system according to a first embodiment of the present disclosure.

FIG. 7 is a block diagram for illustrating a method for operating an artificial intelligence system according to a first embodiment of the present disclosure.

Referring to FIG. 7, the specific electronic device 300 may receive the input data. Specifically, the specific electronic device 300 may receive the video data or the speech data via an input interface 320.

In addition, the specific electronic device 300 may transmit the received input data to the artificial intelligence server 100.

In one example, the processor 180 of the artificial intelligence server 100 may receive the input data from the specific electronic device.

Then, the processor 180 of the artificial intelligence server 100 may input the input data into a recognition model.

In one example, the recognition model may include a deep learning common model 710 and a deep learning personalized model 730.

In this connection, the deep learning common model 710 may be a model that is equally applied to various users (or electronic devices of the various users) provided with the recognition service from the artificial intelligence server 100.

That is, model parameters and batch normalization parameters of the deep learning common model 710 when the input data received from the first electronic device 300 is provided to the deep learning common model 710 are the same as model parameters and batch normalization parameters of the deep learning common model 710 when the input data received from the second electronic device 400 is provided to the deep learning common model 710.

In this connection, the deep learning common model 710 may be a neural network trained by labeling corresponding result value (recognition result) on input data collected from the various electronic devices.

Specifically, the AI server 200 uses the input data (speech data or image data) collected from the various electronic devices as an input value and uses the result value (recognition result) corresponding to the input value as an output value to train a neural network.

In this case, the neural network may use training data (the input data collected from the various electronic devices) and labeling data (the recognition result) to infer a function for a correlation between training data and labeling data. Further, the neural network may determine (optimize) parameters of the neural network by evaluating the inferred function. In this manner, the neural network may be trained to output the recognition result corresponding to the input data.

As such, the neural network trained using the training data (the input data collected from the various electronic devices) and the labeling data (the recognition result) may be referred to as the deep learning common model 710. The term deep learning common model 710 may be used interchangeably with the term common model 710.

In one example, the deep learning common model 710 may be mounted on the artificial intelligence server 100.

In addition, the deep learning common model 710 may be retrained and updated.

Specifically, after the deep learning common model 710 is mounted on the artificial intelligence server 100, the processor 180 may train the deep learning common model 710 using the input data (speech data or image data) collected from the various electronic devices as the input value and using the result value (recognition result) corresponding to the input value as the output value. Accordingly, the parameters of the deep learning common model 710 may be reset (updated)

In one example, the deep learning personalized model 730 may be a model that is individually applied to the various users (or the electronic devices of the various users) provided with the recognition service from the artificial intelligence server 100.

That is, at least one of the model parameter and the batch normalization parameter of the deep learning common model 710 when the input data received from the first electronic device 300 is provided to the deep learning common model 710 may be different from at least one of the model parameter and the batch normalization parameter of the deep learning common model 710 when the input data received from the second electronic device 400 is provided to the deep learning common model 710.

That is, when the input data is received from the specific electronic device, the personalized information corresponding to the specific electronic device ('at least one of a weight value and the batch normalization parameter' corresponding to the specific electronic device) may be applied to the deep learning personalized model 730. In addition, the deep learning personalized model 730 to which the personalized information corresponding to the specific electronic device (the at least one of the weight value and the batch normalization parameter corresponding to the specific electronic device) may process the input data received from the specific electronic device to output a result value.

In this connection, the personalized information corresponding to the specific electronic device (the at least one of the weight value and the batch normalization parameter), which is unique information of the specific electronic device, may be information applied only to the specific electronic device.

Specifically, the neural network may be trained to output the recognition result corresponding to the input data.

Further, the personalized information corresponding to the specific electronic device (the at least one of the weight value and the batch normalization parameter) may be a parameter of the neural network calculated (optimized) in a process of training the neural network using a database (e.g., the input data collected from the specific electronic device) corresponding to the specific electronic device as training data.

In one example, the term deep learning personalized model 730 may be used interchangeably with the term personalized model 730.

In one example, the neural network may refer to an overall model having a problem solving ability by changing a strength of connection of synapses through training of an artificial neuron (node) that formed a network by the synapse connection. Further, the above-described weight value may mean a connection intensity between nodes (neurons), that is, the connection strength of the synapses.

In one example, the batch normalization parameter may be a parameter used for batch normalization.

In this connection, the batch normalization may mean normalizing a distribution of output of each layer to a corresponding value in order to prevent instability due to a change in the distribution of each layer.

Further, the batch normalization parameter may include a plurality of 'averages and variances' corresponding to the plurality of layers included in the personalized model 730, respectively.

For example, when the personalized model 730 includes a first layer, a second layer, and a third layer, the batch normalization parameter may include an average and variance corresponding to a first layer, an average and variance corresponding to a second layer, and an average and variance corresponding to a third layer.

In one example, the processor 180 may input the input data into the recognition model. Specifically, the processor 180 may input the input data into the common model 710 among the common model 710 and the personalized model 730.

In this case, the common model 710 may output the intermediate result value (target feature vector). In this connection, the intermediate result value may be a recognition result corresponding to the plurality of electronic devices (or the plurality of users) globally.

In one example, the processor 180 may apply the personalized information corresponding to the specific electronic device to the recognition model. Specifically, the processor 180 may apply the personalized information corresponding to the specific electronic device to the personalized model 730.

More specifically, when the personalized information corresponding to the specific electronic device includes the batch normalization parameter corresponding to the specific electronic device, the processor 180 may apply the batch normalization parameter to the personalized model 730.

In this case, the batch normalization parameter of the personalized model 730 may be set as a batch normalization parameter corresponding to the specific electronic device. Accordingly, the plurality of 'averages and variances' respectively corresponding to the plurality of layers included in the personalized model 730 may be newly set.

In addition, when the personalized information corresponding to the specific electronic device includes at least one weight value corresponding to the specific electronic device, the processor 180 may apply the at least one weight value to the personalized model 730.

In this case, the connection intensity between the nodes of the personalized model 730 may be set to the at least one weight value corresponding to the specific electronic device. Accordingly, the connection intensity between the nodes included in the personalized model 730 may be newly set.

In one example, the processor 180 may obtain the final result value by inputting the input data into the recognition model to which the personalized information is applied.

Specifically, the processor 180 may obtain the intermediate result value by inputting the input data to the common model 710, apply the personalized information corresponding to the specific electronic device to the personalized model 730, and input the intermediate result value output from the common model 710 to the personalized model 730 to which the personalized information is applied.

In this case, the personalized model 730 to which the personalized information is applied may output the final result value (target feature vector). In this connection, the final result value may be the recognition result corresponding only to the specific electronic device transmitted the input data.

In one example, the processor 180 may transmit the final result value (recognition result) to the specific electronic device.

In this case, the specific electronic device 300 may receive the final result value. The specific electronic device 300 may store the final result value in a memory, perform an operation corresponding to the final result value, or output the final result value.

In one example, two methods for obtaining the personalized information will be described.

First, as the first method for obtaining the personalized information, the processor 180 may receive the input data and the personalized information corresponding to the specific electronic device from the specific electronic device and apply the received personalized information to the personalized model.

Specifically, the personalized information corresponding to the specific electronic device 300 may be stored in the memory of the specific electronic device 300. Further, when the specific electronic device 300 transmits the input data to the artificial intelligence server 100, the processor of the specific electronic device 300 may transmit the personalized information corresponding to the specific electronic device 300 together with the input data to the artificial intelligence server 100.

In this case, the artificial intelligence server 100 may receive the input data and the personalized information corresponding to the specific electronic device 300 from the specific electronic device 300. In addition, the processor 180 of the artificial intelligence server 100 may obtain the intermediate result value by inputting the input data to the common model 710. In addition, the processor 180 of the artificial intelligence server 100 may apply the received personalized information to the personalized model 730.

Further, the processor 180 may input the intermediate result value output from the common model 710 into the personalized model 730 to which the personalized information is applied. When the personalized model 730 to which the personalized information is applied outputs the final result value, the processor 180 of the artificial intelligence server 100 may transmit the final result value to the specific electronic device 300.

In one example, when the personalized information is received, the processor 180 of the artificial intelligence server 100 may store the received personalized information in the memory. When the personalized model 730 outputs the final result value or when the artificial intelligence server 100 transmits the final result value to the specific electronic device 300, the processor 180 of the artificial intelligence server 100 may delete the personalized information stored in the memory.

In one example, the processor 180 of the artificial intelligence server 100 may use user feedback or other training data to retrain and update the personalized model 730. In this case, the personalized information corresponding to the personalized model 730 may be reset.

Further, the processor of the artificial intelligence server 100 may transmit the reset personalized information, that is, the personalized information corresponding to the updated personalized model, to the specific electronic device 300.

In this case, the processor of the specific electronic device 300 may receive the personalized information corresponding to the updated personalized model and store the received personalized information in the memory.

Further, when new input data is received, the processor of the specific electronic device 300 may transmit the new input data to the artificial intelligence server 100. In this case, the processor of the specific electronic device 300 may transmit the personalized information stored in the memory together with the new input data to the artificial intelligence server 100.

Next, referring to FIG. 8, a second method for obtaining the personalized information will be described.

Figure 8:
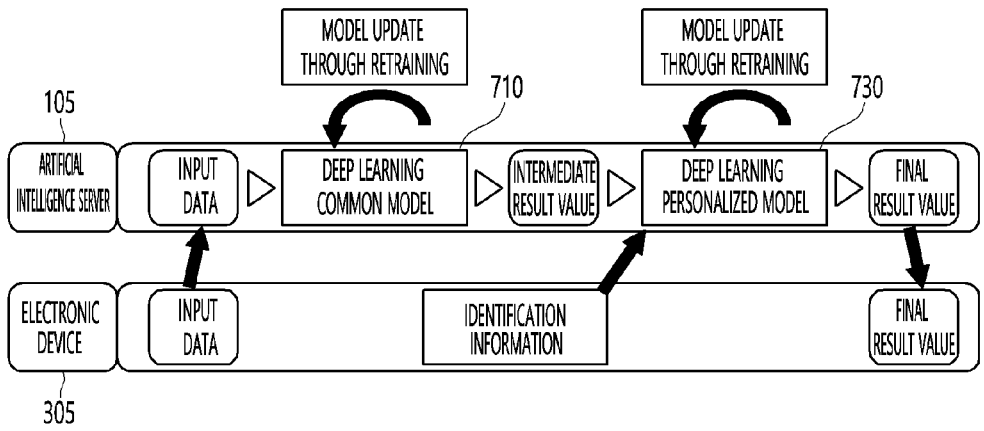
FIG. 8 is a block diagram for illustrating a second method for obtaining personalized information.

FIG. 8 is a block diagram for illustrating a second method for obtaining personalized information.

As the second method for obtaining the personalized information, the memory 170 may store a plurality of personalized information corresponding to the plurality of electronic devices, respectively.

Further, the processor may receive the input data and identification information corresponding to the specific electronic device from the specific electronic device 300, obtain personalized information corresponding to the identification information from the memory, and apply the personalized information corresponding to the identification information to the personalized model.

Specifically, the identification information (e.g., ID) corresponding to the specific electronic device 300 may be stored in the memory of the specific electronic device 300. Further, when the specific electronic device 300 transmits the input data to the artificial intelligence server 100, the processor of the specific electronic device 300 may transmit the identification information corresponding to the specific electronic device 300 together with the input data to the artificial intelligence server 100.

In this case, the artificial intelligence server 100 may receive the input data and the identification information corresponding to the specific electronic device 300 from the specific electronic device 300. In addition, the processor 180 of the artificial intelligence server 100 may obtain the intermediate result value by inputting the input data to the common model 710.

In addition, the processor 180 of the artificial intelligence server 100 may obtain the personalized information corresponding to the identification information among the plurality of personalized information from the memory 170. In addition, the processor 180 of the artificial intelligence server 100 may apply the obtained personalized information to the personalized model 730.

Further, the processor 180 may input the intermediate result value output from the common model 710 into the personalized model 730 to which the personalized information is applied. When the personalized model 730 to which the personalized information is applied outputs the final result value, the processor 180 of the artificial intelligence server 100 may transmit the final result value to the specific electronic device 300.

In one example, the processor 180 of the artificial intelligence server 100 may use the user feedback or other training data to retrain and update the personalized model 730. In this case, the personalized information corresponding to the personalized model 730 may be reset.

The processor of the artificial intelligence server 100 may store the reset personalized information, that is, the personalized information corresponding to the updated personalized model, in the memory 170.

In one example, when the new input data is received, the processor of the specific electronic device 300 may transmit the new input data and the identification information corresponding to the specific electronic device to the artificial intelligence server 100. In this case, the processor of the artificial intelligence server 100 may obtain the personalized information corresponding to the updated personalized model from the memory using the received identification information.

As such, according to the present disclosure, the artificial intelligence server 100 has an advantage of saving the storage space of the artificial intelligence server 100 while providing the personalized recognition service to each of the plurality of electronic devices.

For example, when receiving the personalized information from the electronic device 300, the artificial intelligence server 100 only needs to have a space for temporarily storing the received personalized information. Therefore, the storage space of the artificial intelligence server 100 may be significantly reduced.

In addition, the batch normalization parameter occupies much less capacity than the weight value. Therefore, when receiving the batch normalization parameter from the electronic device 300, compared with a case of receiving the weight value, the capacity of the data to be communicated may be reduced.

In addition, in an embodiment of receiving the identification information from the electronic device 300 and using the identification information to read the batch normalization parameter stored in the memory 170, a storage space of the server may be reduced compared to a case in which a plurality of deep learning models corresponding to a plurality of users are provided in the server. For example, it is assumed that a size of the deep learning model for the speech recognition is 80 MB and 130,000 electronic devices provide the speech recognition services from the server. In this case, when 130,000 personalized deep learning models are generated, the artificial intelligence server 100 requires 1 TB of storage space. However, according to the present disclosure, since the plurality of batch normalization parameters respectively corresponding to the plurality of users are stored in the artificial intelligence server 100 and the size of the batch normalization parameter is only about 1 MB, the storage space of the server is significantly reduced.

A personalization method in consideration of the usage environment of the user will be described.

Figure 9:
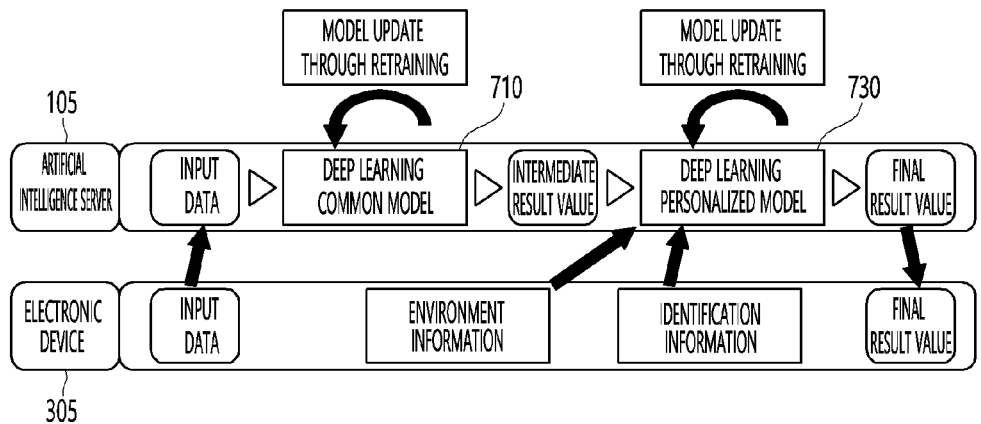
FIG. 9 illustrates a personalization method in consideration of a usage environment of a user according to an embodiment of the present disclosure.

FIG. 9 illustrates a personalization method in consideration of a usage environment of a user according to an embodiment of the present disclosure.

The processor of the specific electronic device 300 may transmit the identification information and environment information corresponding to the specific electronic device 300 together with the input data to the artificial intelligence server 100.

In this connection, the environment information may include at least one of a magnitude of noise and illuminance.

Specifically, the specific electronic device 300 may have an algorithm that may measure a magnitude of noise from the received speech data, an algorithm that may measure ambient illuminance from the received video data, or a sensor that may measure the ambient illuminance.

In addition, the specific electronic device 300 may transmit at least one of the magnitude of the measured noise and the measured illuminance to the artificial intelligence server 100.

In this case, the artificial intelligence server 100 may receive the input data and the identification information and the environment information corresponding to the specific electronic device 300 from the specific electronic device 300.

In addition, the processor 180 of the artificial intelligence server 100 may input the input data to the common model 710 to obtain the intermediate result value.

In addition, the processor 180 of the artificial intelligence server 100 may apply the personalized information corresponding to the specific electronic device 300 to the personalized model 730.

The processor 180 may input the intermediate result value and the environment information output from the common model 710 into the personalized model 730 to which the personalized information is applied. Then, when the personalized model 730 to which the personalized information is applied outputs the final result value, the processor 180 of the artificial intelligence server 100 may transmit the final result value to the specific electronic device 300.

As such, according to the present disclosure, rather than performing personalization only on the speech or video that is a subject of the recognition, the personalization may be performed in consideration of the usage environment of the electronic device.

Figure 10:
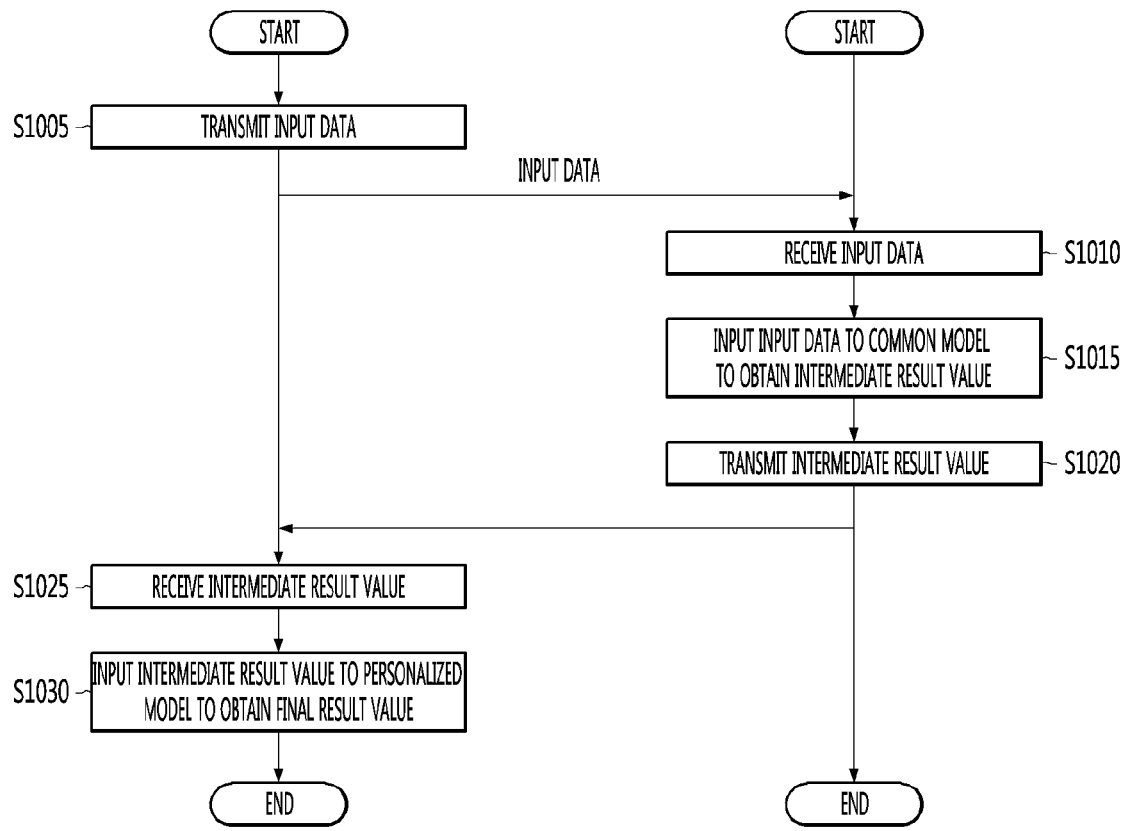
FIG. 10 is a flowchart for illustrating a method for operating an artificial intelligence system according to a second embodiment of the present disclosure.

FIG. 10 is a flowchart for illustrating a method for operating an artificial intelligence system according to a second embodiment of the present disclosure.

The method for operating the artificial intelligence system according to the second embodiment of the present disclosure may include receiving, by the specific electronic device 300, the input data and transmitting the received input data to the artificial intelligence server 100 (S1005), receiving, by the artificial intelligence server 100, the input data from the specific electronic device (S1010), inputting, by the artificial intelligence server 100, the input data to the common model to obtain the intermediate result value (S1015), transmitting, by the artificial intelligence server 100, the intermediate result value to the specific electronic device 300 (S1020), receiving, by the specific electronic device 300, the intermediate result value (S1025), and inputting, by the specific electronic device 300, the intermediate result value to the personalized model to obtain the final result value (S1030).

The second embodiment will be described in detail with reference to FIG. 11.

Figure 11:
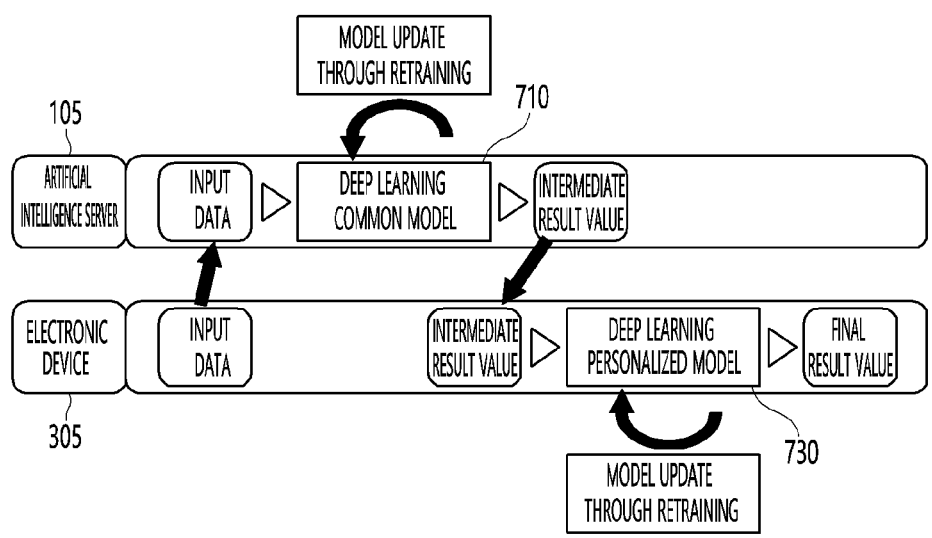
FIG. 11 is a block diagram for illustrating a method for operating an artificial intelligence system according to a second embodiment of the present disclosure.

FIG. 11 is a block diagram for illustrating a method for operating an artificial intelligence system according to a second embodiment of the present disclosure.

Referring to FIG. 11, the specific electronic device 300 may receive the input data. Specifically, the processor 380 of the specific electronic device 300 may receive the video data or the speech data via the input interface 320.

In addition, the specific electronic device 300 may transmit the received input data to the artificial intelligence server 100.

In one example, the processor 180 of the artificial intelligence server 100 may receive the input data from the specific electronic device.

Then, the processor 180 of the artificial intelligence server 100 may input the input data into the common model 710 mounted in the artificial intelligence server 100.

In one example, the common model 710 may output the intermediate result value in response to the input data. In this case, the processor 180 of the artificial intelligence server 100 may transmit the intermediate result value to the specific electronic device 300. In this case, the processor 380 of the specific electronic device 300 may receive the intermediate result value that is the output value of the common model 710 for the input data from the artificial intelligence server.

In one example, the personalized model 730 may be mounted on the electronic device 300. In addition, the processor 380 of the electronic device 300 may input the intermediate result value to the personalized model 730 to obtain the final result value.

As such, according to the present disclosure, while saving the storage space of the artificial intelligence server 100, the recognition service personalized to each of the plurality of electronic devices may be provided.

For example, it is assumed that the size of the deep learning model for the speech recognition is 80 MB and the 130,000 electronic devices provide the speech recognition services from the server. In this case, when the 130,000 personalized deep learning models are generated, the artificial intelligence server 100 requires 1 TB of the storage space. However, according to the present disclosure, since the personalized models are respectively distributed and stored in the electronic devices, the artificial intelligence server 100 only requires a storage space for storing one common model.

In one example, it is difficult to secure a label for retraining for each electronic device. Accordingly, the processor 380 may train the personalized model 730 using entropy of the final result value of the personalized model 730.

For example, entropy when the personalized model 730 outputs final result values of class A 30%, class B 30%, and class C 40% is larger than entropy when the personalized model 730 outputs final result values of class A 99%, class B 0.5%, and class C 0.5%.

In addition, the processor 380 may train the personalized model 730 such that the entropy of the final result value of the personalized model 730 is reduced.

As such, according to the present disclosure, personalized update of the electronic device, which is difficult to secure the label for the retraining may be effectively achieved.

In one example, the present disclosure can be used to update the user.

In one example, the present disclosure may be used for update of the user.

For example, it is assumed that the recognition model according to the present disclosure is a face detector, and a specific user registers a face of another user.

In this case, the processor 380 of the electronic device 300 may update the personalized model 730 using video data of another user.

That is, since it is difficult to update the entire recognition models in the electronic device 300, the intermediate result value may be easily and quickly updated using a scheme using the value provided from the artificial intelligence server 100 and updating only the personalized model portion.

The present disclosure described above may be implemented as a computer-readable code in a medium where a program is recorded. A computer-readable medium includes all kinds of recording devices that store data that may be read by a computer system. Examples of the computer-readable medium may include hard disk drive (HDD), solid state drive (SSD), silicon disk drive (SDD), read-only memory (ROM), random access memory (RAM), CD-ROM, a magnetic tape, a floppy disk, an optical data storage device, and the like. Further, the computer may include the processor 180 of the AI device 100. Accordingly, the detailed description should not be construed as being limited in all respects but should be considered as illustrative. The scope of the present disclosure should be determined by reasonable interpretation of the appended claims, and all changes within the equivalent scope of the present disclosure are included in the scope of the present disclosure.

What is claimed is:

1. An artificial intelligence server comprising:
   a communicator in communication with a plurality of electronic devices;
   a memory for storing a common model and a personalized model,
   wherein the common model is set with a same batch normalization parameter for each of the plurality of electronic devices, and the personalized model is set with different batch normalization parameters for each of the plurality of electronic devices, and
   wherein an average and a variance corresponding to each of a plurality of layers included in the personalized model are changed by the different batch normalization parameters for each of the plurality of electronic devices; and
   a processor configured to:
   receive input data from a specific electronic device among the plurality of electronic devices;
   input the received input data to the common model to obtain a first recognition result for the specific electronic device, the first recognition result being a recognition result commonly applied to the plurality of electronic devices;
   receive personalized information including a batch normalization parameter unique to the specific electronic device from the specific electronic device;
   apply the batch normalization parameter unique to the specific electronic device to the personalized model to change a batch normalization parameter of the personalized model to the batch normalization parameter unique to the specific electronic device;
   input the obtained first recognition result to the personalized model having the batch normalization parameter changed to the batch normalization parameter unique to the specific electronic device to obtain a second recognition result for the specific electronic device, the second recognition result being a recognition result only applied to the specific electronic device; and
   transmit the obtained second recognition result to the specific electronic device.

2. The artificial intelligence server of claim 1, wherein the processor is further configured to:
   update the personalized model; and
   transmit the received personalized information corresponding to the updated personalized model to the specific electronic device.

3. An artificial intelligence server comprising:
   a communicator in communication with a plurality of electronic devices;
   a memory for storing a common model, a personalized model, and a plurality of personalized information respectively corresponding to the plurality of electronic devices,
   wherein each of the plurality of personalized information comprises identification information and a batch normalization parameter corresponding to each of the plurality of electronic devices,
   wherein the common model is set with a same batch normalization parameter for each of the plurality of electronic devices, and the personalized model is set with different batch normalization parameters for each of the plurality of electronic devices, and
   wherein an average and a variance corresponding to each of a plurality of layers included in the personalized model are changed by the different batch normalization parameters for each of the plurality of electronic devices; and
   a processor configured to:
   receive input data from a specific electronic device among the plurality of electronic devices;
   input the received input data to the common model to obtain a first recognition result for the specific electronic device, the first recognition result being a recognition result commonly applied to the plurality of electronic devices;
   receive identification information corresponding to the specific electronic device from the specific electronic device;
   obtain a batch normalization parameter unique to the specific electronic device from the personalized information corresponding to the specific electronic device among the plurality of personalized information stored in the memory, based on the received identification information;
   apply the obtained batch normalization parameter unique to the specific electronic device to the personalized model to change a batch normalization parameter of the personalized model to the batch normalization parameter unique to the specific electronic device;
   input the obtained first recognition result to the personalized model having the batch normalization parameter changed to the batch normalization parameter unique to the specific electronic device to obtain a second recognition result for the specific electronic device, the second recognition result being a recognition result only applied to the specific electronic device; and
   transmit the obtained second recognition result to the specific electronic device.

4. The artificial intelligence server of claim 3, wherein the processor is further configured to:
   update the personalized model; and
   store personalized information corresponding to the updated personalized model in the memory.

5. The artificial intelligence server of claim 3, wherein the input data is video data or speech data.

6. An artificial intelligence server comprising:
a communicator in communication with a plurality of electronic devices;
a memory for storing a common model, a personalized model, and a plurality of personalized information respectively corresponding to the plurality of electronic devices,
wherein each of the plurality of personalized information comprises identification information and a batch normalization parameter,
wherein the common model is set with a same batch normalization parameter for each of the plurality of electronic devices, and the personalized model is set with different batch normalization parameters for each of the plurality of electronic devices, and
wherein an average and a variance corresponding to each of a plurality of layers included in the personalized model are changed by the different batch normalization parameters for each of the plurality of electronic devices; and
a processor configured to:
receive input data from a specific electronic device among the plurality of electronic devices;
input the received input data to the common model to obtain a first recognition result for the specific electronic device, the first recognition result being a recognition result commonly applied to the plurality of electronic devices;
receive identification information and environment information corresponding to the specific electronic device from the specific electronic device;
obtain a batch normalization parameter unique to the specific electronic device from the personalized information corresponding to the specific electronic device among the plurality of personalized information stored in the memory, based on the received identification information;
apply the obtained batch normalization parameter unique to the specific electronic device to the personalized model to change a batch normalization parameter of the personalized model to the batch normalization parameter unique to the specific electronic device;
input the obtained first recognition result and the environment information to the personalized model having the batch normalization parameter changed to the batch normalization parameter unique to the specific electronic device to obtain a second recognition result for the specific electronic device, the second recognition result being a recognition result only applied to the specific electronic device; and
transmit the obtained second recognition result to the specific electronic device,
wherein the environment information comprises at least one of a magnitude of noise or illuminance.

* * * * *